United States Patent [19]

Gunnerman et al.

[11] Patent Number: 4,613,339
[45] Date of Patent: Sep. 23, 1986

[54] PROCESS FOR PREPARING AND USING SWEET SORGHUM IN A FUEL PRODUCT

[76] Inventors: Rudolf W. Gunnerman, 2800 City View, Eugene, Oreg. 97401; William A. Farone, 9519 Groundhog Dr., Richmond, Va. 23235

[21] Appl. No.: 685,851

[22] Filed: Dec. 24, 1984

[51] Int. Cl.$^4$ .............................................. C10L 5/44
[52] U.S. Cl. .................................... 44/1 D; 44/10 A; 44/15 B
[58] Field of Search ..................... 44/1 D, 10 A, 15 B

[56] References Cited

U.S. PATENT DOCUMENTS

| | | |
|---|---|---|
| 3,227,530 | 1/1966 | Levelton . |
| 3,492,134 | 1/1970 | Brummendorf . |
| 4,015,951 | 4/1977 | Gunnerman . |
| 4,043,764 | 8/1977 | Loas .................................. 44/10 A |
| 4,152,119 | 5/1979 | Schulz .................................... 44/1 D |
| 4,308,033 | 12/1981 | Gunnerman ......................... 44/10 A |
| 4,363,636 | 12/1982 | Bouvet et al. ....................... 44/10 A |

FOREIGN PATENT DOCUMENTS 8302779  8/1983  United Kingdom ................. 44/1 D

OTHER PUBLICATIONS

Reineke, L. H., "Briquets from Wood Residue", U.S. Forest Service Research Note FPL-075, Nov. 1964.
Schery, R. W., *Plants for Man*, Prentice-Hall, Inc., Second Ed., 1972.
Lipinsky, E. S., et al., "Sugar Crops as a Source of Fuels, vol. I: Agricultural Research", Research Report for U.S. Dept. of Energy, 7/31/78.
Lipinsky, E. S., et al., "Sugar Crops as a Source of Fuels, vol. II: Processing and Conversion Research", Research Report for U.S. Dept. of Energy, 8/31/78.
"Production of Sugarcane and Tropical Grasses as a Renewable Energy Source", Second Annual Report 1978-1979 to U.S. Dept. of Energy.
Jackson, D. R., et al., "Development of Sweet Sorghum as an Energy Crop, vol. 1: Agricultural Task", Research Report for U.S. Dept. of Energy, May 31, 1980.
West River Agricultural Research and Extension Center *Crops and Soil Research*, Annual Progress Report, Plant Science Pamphlet No. 59, Dec. 1980.
West River Agricultural Research and Extension Center *Crops and Soil Research*, Annual Progress Report, Plant Science Pamphlet No. 64, Dec. 1981.
Ginoza, H. S., et al., "1982 Evaluation of Sweet Sorghum", Agricultural Research Service Report—U.S. Dept. of Agriculture.
Hiler, E. A., et al., "Sorghums for Methane Production", Texas Agricultural Experiment Station—Texas A&M Univ., Annual Report Apr. 1983-Mar. 1984.
Kresovich, S., et al., "Sweet Sorghum Breeding Line Evaluations: 1981-1982", Texas Agricultural Experiment Station—Texas A&M Univ., PR-4181, Dec. 1983.
Dobbs, T. L., et al., "Alternative Crops for Ethanol Fuel Production: Agronomic, Processing, and Economic Considerations", Research Report 84-1 by Economics Dept., South Dakota State Univ., Apr. 1984.
Information Sheet on SUCROSORGO 405 ®, Northrup King Company.
Monk, R. L., et al., "Improvements of Sorghum for Energy Production", Texas Agricultural Experiment Station—Texas A&M Univ.
Reineke, L. H., "Wood Fuel Preparation", U.S. Forest Service Research Note FPL-090.
Clark, J. P., et al., "Construction and Demonstration of a Modern Community-Sized Sorghum Sirup Plant", Virginia Polytechnical Institute and State Univ.
Geise, H., et al., "Sorghum Forage Trials", Dec. 1973, Plant Science Department Pamphlet No. 17.

*Primary Examiner*—Carl F. Dees
*Attorney, Agent, or Firm*—Klarquist, Sparkman, Campbell, Leigh & Whinston

[57] ABSTRACT

A method for preparing and using a combustible fuel product using sweet sorghum is disclosed. A sorghum variety high in sugar, high in biomass, and low in nitrogen is first processed to remove a majority of sugars therefrom. The remaining ligno-cellulosic residue, commonly known as bagasse, is converted into combustible pellets or alternatively stored for future pelletization. Storage is accomplished by first piling the bagasse on a hard surface. The bagasse is then compressed to form a compacted mass. Compression frees trapped air in the pile, hindering oxidative degradation by bacteria and other microorganisms.

5 Claims, No Drawings

PROCESS FOR PREPARING AND USING SWEET SORGHUM IN A FUEL PRODUCT

BACKGROUND OF THE INVENTION

This invention relates to a process for preparing fuel materials, and more particularly, to the preparation of fuel materials from sweet sorghum bagasse.

As fossil fuel sources become increasingly scarce, it will be necessary to produce alternative energy materials. Alternative materials must be inexpensive, readily available, and preferably derived from renewable sources. They must also be sufficiently non-polluting.

Wood and wood by-products are prime examples of renewable energy materials presently in use. L. H. Reineke, in "Wood Fuel Preparation", U.S. Forest Service Research Note FPL-090, Forest Products Laboratory, Forest Service—U.S. Dept. of Agriculture, pp. 1-14, describes the preparation of wood fuels. Reineke indicates that wood is usable in various forms including chips, sawdust, shavings, and briquets. Reineke further describes the preparation of wood briquets in "Briquets From Wood Residue", U.S. Forest Service Research Note FPL-075, November 1964, Forest Products Laboratory, Forest Service, U.S. Department of Agriculture. Another reference describing wood and fibre-based fuel materials is U.S. Pat. No. 3,227,530 to B. H. Levelton, entitled "Process of Producing Fuel Logs". This patent discloses a process in which plant materials are shaped and formed into fuel logs.

However, there are distinct disadvantages in using wood-based fuel products. As wood fuel consumption increases, raw material costs will increase proportionately. In addition, the availability of particulate wood by-products is dependent on the increasing use of such materials in particleboard and fibreboard. Finally, trees require a long growth period. This long period decreases the desirability of wood as a renewable energy soure.

As an alternative to wood-based products, other agricultural materials have been examined. Both sugarcane and sweet sorghum are agricultural products which have been studied. According to R. W. Schery, *Plants for Man*, Prentice-Hall, Inc., Second Ed., 1972, pp. 371-374, sugarcane is a coarse grass grown in humid tropical lowlands. Schery indicates that 1 to 1½ years are required to grow and harvest sugarcane. However, sugarcane requires temperate, humid growing conditions. It is not adaptable to growth in colder regions of the United States.

In comparison with sugarcane, sweet sorghum is more resistant to colder temperatures. It also requires less humid climates. According to R. L. Monk, et al., "Improvements of Sorghum for Energy Production", Texas Agricultural Experiment Station—Texas A&M University, sorghum (*Sorghum bicolor* (L.) Moench) is a tropical grass which may be grouped into three basic types. These types include grain, forage, and sweet sorghum. However, over 22,000 varieties of sorghum exist throughout the world. D. R. Jackson, et al., in "Development of Sweet Sorghum as an Energy Crop, Volume 1: Agricultural Task", Research Report for U.S. Department of Energy, Battelle Laboratories Columbus Division, May 31, 1980, page 22, describes sweet sorghum as a member of the grass family which is drought tolerant and adaptable to most major agricultural regions of the United States.

Historically, sorghum is indigenous to Africa. S. Kresovich, et al., in "Sweet Sorghum Breeding Line Evaluations: 1981-1982", Texas Agricultural Experiment Station—Texas A&M University, PR-4181, December 1983, indicates that the culture of sweet sorghum was first introduced to the United States in 1853. Early uses of sweet sorghum involved syrup production, according to J. P. Clark, et al., "Construction and Demonstration of a Modern Community-Sized Sorghum Sirup Plant", Virginia Polytechnic Institute and State University. However, syrup production later diminished for practical and economic reasons. Clark, et al. indicates that sorghum syrup production peaked at over 28 million gallons per year in the early 1880's, and peaked again to nearly 50 million gallons per year in 1920. Production continuously declined thereafter. Today, production is approximately 1 million gallons per year.

As described by R. L. Monk, et al., in "Improvement of Sorghum for Energy Production", supra, pp. 2-3, sorghum has many advantageous biological characteristics. It has a high photosynthetic rate and high drought tolerance. It is also capable of growing under high light and heat intensities. In addition, sorghum plants have a waxy surface which reduces internal moisture loss and facilitates drought resistance.

In recent years, a renewed interest in sweet sorghum has occurred. Primarily, research has been conducted on the use of sorghum as an energy source. This research has been directed to ethanol production from sorghum materials. Ethanol production from sugar-producing grasses including sweet sorghum is described in detail in E. S. Lipinsky, et al., "Sugar Crops as a Source of Fuels, Vol. I: Agricultural Research", Research Report for U.S. Dept. of Energy, Battelle Laboratories Columbus Division, July 31, 1978; E. S. Lipinsky, et al., "Sugar Crops as a Source of Fuels, Vol. II: Processing and Conversion Research", Research Report for U.S. Dept. of Energy, Battelle Laboratories Columbus Division, Aug. 31, 1978; and T. L. Dobbs, et al., "Alternative Crops for Ethanol Fuel Production: Agronomic, Processing, and Economic Considerations", Research Report 84-1 by Economics Department, South Dakota State University, April 1984.

Another way of using of sorghum as a fuel product involves combustion of solid sorghum waste materials. The removal of sugar-containing fluids from sorghum produces considerable quantities of ligno-cellulosic residue, otherwise known as "bagasse". According to Lipinsky, "Sugar Crops as a Source of Fuels—Vol. I: Agricultural Research", supra, p. 173, suggested uses for bagasse include pulp and paper manufacturing, and livestock feed. To produce energy, raw sorghum bagasse has been burned as a fuel source. For example, Jackson, et al., supra, page 80, suggests that sorghum waste products may be useful as combustible fuel. Research has also been conducted on the anaerobic digestion of sorghum to produce methane as described in E. A. Hiler, et al., in "Sorghums for Methane Production", Texas Agricultural Experiment Station, Texas A & M Univeristy, Annual Report, April 1983 –March 1984.

However, none of the above references describes inexpensive and effective methods to convert sorghum bagasse into usable fuel which is easily handled and sufficiently non-polluting. Moreover, none of the references discusses efficient and effective methods of storing and preserving unprocessed sorghum materials prior to conversion into fuel. The Hiler, et al. article discusses specific methods of storing harvested sorghum prior to digestion for producing methane. For example, pages 5-2, 5-3, 5-4 and 5-9 of the article describe various storage techniques, including silo storage of chopped material, baling and subsequent storage of field-dried material, rack storage of whole stalks, and chemical treatment of sorghum with preservatives including formic, propionic, and acrylic acid. All of these methods offer particular disadvantages. Silo storage requires expensive physical containment structures. It also requires the maintenance of strict anaerobic conditions to avoid bacterial spoilage. Baling requires a large quantity of physical labor. Chemical treatment is expensive and potentially hazardous. Finally, whole stalk storage is expensive, requires a substantial amount of storage space, and does not effectively inhibit microbial degradation.

To store bagasse, a common approach involved spraying water on bagasse piles, thereby maintaining high moisture levels in the material. This approach is called the Ritter method. Another method involved baling the bagasse in stacks which permit significant air flow through the material. However, both of these methods are expensive and result in heavy losses of biomass.

Because of its durability, low cost, and availability, sweet sorghum and its by-products represent a potentially valuable alternative energy source. However, a distinct need exists for methods to process these materials into efficient, non-polluting fuel. Also, a need exists for a method of storing the unprocessed sorghum materials which avoids undesirable oxidative degradation by microorganisms.

SUMMARY OF THE INVENTION

It is an object of the present invention to provide a process for producing compact, combustible fuel materials from sweet sorghum.

Another object of the present invention is to provide an efficient and economical process for producing fuel materials from sweet sorghum.

Another object of the present invention is to provide a process for producing from sweet sorghum fuel materials which are easily handled, stored, and used.

A further object of the present invention is to provide a process for producing from sweet sorghum fuel materials which produce minimal amounts of polluting substances on combustion.

Yet another object of the present invention is to provide a process in which unprocessed sorghum materials may be stored for extended periods of time prior to conversion into fuel without spoilage.

These and other objects and advantages of the present invention will become more readily apparent from the following detailed description.

DETAILED DESCRIPTION

The present invention involves the production of combustible energy materials from sweet sorghum. It should be noted that the concepts and processes described herein are not necessarily limited to sorghum. For example, sugarcane varieties having the desired characteristics may be used in the invention. However, sorghum is preferred over sugarcane for a variety of reasons. Sorghum has a shorter growing season, and shows superior drought resistance. According to Monk, et al. in "Improvements of Sorghum for Energy Production", supra, a frost-free period of 100-140 days will mature adapted sorghum cultivars. These characteristics allow sorghum to be grown throughout the continental United States. Conversely, sugarcane is a tropical grass which requires warm, humid conditions. It can only be grown in certain areas. For these reasons, sorghum is preferred over sugarcane, and the invention will be described below using sweet sorghum.

It is important to choose the right variety of sorghum in order to obtain a fuel product which burns cleanly and efficiently. We have discovered that the variety should have at least 5% by weight extractable sugar, less than 0.75% (dry weight) total nitrogen, and should yield at least five tons (dry weight) of biomass per acre. Nitrogen content of the plant is especially important. The selected plant must be sufficiently low in nitrogen to avoid excessive production of nitrogen oxides during combustion of the final product.

A sorghum hybrid produced by the Northrup King Corporation called SUCROSORGO 405 ® is ideal for use in the present invention. SUCROSORGO 405 ® is a medium-late maturing hybrid which requires 115-125 days from planting to harvest. In European performance trials, a harvest of SUCROSORGO 405 ® produced an average of 19.77 tons of dry matter per hectare (8 tons (dry weight) per acre) and an average of 5.02 tons of sugar per hectare. A hectare is a metric unit of area equal to 10,000 square meters. SUCROSORGO 405 ® has been determined to have about 0.48% (dry weight) total nitrogen.

After selection of the desired variety, the plants are cultivated and harvested. Harvesting is preferably accomplished using forage methods. These methods avoid excessive contact of the sorghum plants with the soil, resulting in a cleaner final product.

After harvesting, the sorghum is milled by conventional means to remove sugar-containing fluids. It is desirable to remove about 90% by weight of the total sugar-containing fluid. The removed fluid is clarified to eliminate chlorophyll and other extraneous materials.

Clarification is accomplished using heat treatment and liming (treatment with calcium oxide and magnesium oxide). The fluid is then evaporated to a microbiologically stable, storable syrup. The syrup should contain at least 45% sugar. The syrup is then fermented using processes known in the art to obtain saleable ethanol and carbon dioxide. The ethanol is distilled and sold. Residues from the distillation consist of yeast and unfermented sugars, commonly known as stillage. The stillage may be used as livestock feed.

The ligno-cellulosic fibrous material (stalks and leaves) remaining after fluid extraction is called bagasse. When large quantities of bagasse are available, it will be necessary to store the bagasse for future processing. A storage method must be used which minimizes bacterial and fungal spoilage. Because approximately 10% by weight of the sugar-containing fluid remains in the bagasse, inhibition of spoilage is of considerable importance. In the present invention, storage is accomplished by placing the bagasse in a pile on a hard surface. The pile should be at least 10 feet high. Pressure is then applied to the pile. Pressure may be applied using any practical method. The applied pressure should be at least 35 psi, although approximately 60 psi is preferred. A representative method of applying pressure involves traversing the pile with heavy construction equipment (e.g. bulldozers). However, the equipment must be sufficiently heavy to generate the necessary pressures. Compression of the pile frees air trapped in the bagasse, creating substantially anaerobic conditions within the pile. The substantially anaerobic conditions minimize oxidative degradation by bacteria, fungi, and other microorganisms.

Piles of bagasse constructed according to the present invention are very stable, losing not more than 5% by weight per year of total mass. In addition, tests conducted on a bagasse pile approximately 20 feet high demonstrated that temperatures in the pile were unexpectedly stable. The temperatures were approximately 105° F. two feet into the pile, 112° F. six feet into the pile, and 121° F. seven feet into the pile. A temperature of 117° F. was registered 16 feet into the pile.

The thermal stability of the piles is unexpected for a variety of reasons. Primarily, when other plant materials are piled and compacted as described above, high temperatures and spontaneous combustion often result. This occurrence is common in the storage of tobacco. However, the sorghum bagasse does not spontaneously combust. Temperature levels stabilize within the pile. In addition, the low-nitrogen strains of sorghum used in the present invention contain minimal amounts of potentially reactive nitrate materials (e.g. sodium and potassium nitrate). A lack of nitrate materials reduces the possibility of spontaneous combustion. Tests have shown that sorghum stored for 2½ years as described above did not lose significant amounts of biomass or energy content.

To obtain a compact, usable fuel product, the bagasse is then pelletized. Pelletization is accomplished by a sequence of steps generally described in U.S. Pat. No. 4,015,951 to Gunnerman.

Specifically, the raw bagasse is sent to a cutting mechanism for fibre size adjustment. A preferred cutting mechanism uses a rotary knife design. An example of such a mechanism is a ring knife cutter. The fibre length is adjusted to a substantially uniform maximum dimension not more than 85% of the minimum dimension of the individual pellets to be produced. The adjusted fibres are then dried to reduce their moisture content to approximately 10-22% free moisture by weight. "Free moisture" is defined as the moisture which may be removed by evaporation at normal temperatures. It does not include any water of crystallization that may be present in the bagasse. In most cases, the moisture content of the raw bagasse will be above 22%, and drying will be necessary. However, if the bagasse has a moisture content below 10%, humidification will be necessary to obtain the desired moisture level.

The bagasse fibres are then conveyed to a pelletizing apparatus commonly known in the art. In the apparatus, the bagasse is pressed in dies having a predetermined configuration. The apparatus must produce a die pressure sufficient to increase the bagasse to a temperature of approximately 325° F. to 350° F. During pressurization, wax-like and sugar materials in the bagasse will exude to form a surface skin on the pellets. Retaining at least 10% sugar-containing fluid in the raw bagasse, as described above, facilitates skin formation. The skin provides enhanced pellet durability, and prevents rapid changes in moisture content during pellet combustion. The skin also lubricates die surfaces in the pelletizing apparatus during compression. Die lubrication improves the overall pellet production rate. It is not necessary to add additional binder materials to the bagasse if pressures during pelletization produce sufficient increases in temperature. However, if desired, organic materials, including waxes or the like, may be added to the bagasse for enhanced skin formation.

After pelletization, the completed pellets are air dried, if necessary. The completed pellets have a desired moisture content substantially in equilibrium with ambient atmospheric moisture levels (approximately 9-12% by weight).

The finished pellets, after moisture adjustment, are then stored or used. In the present invention, it is preferred that the pellets be substantially cylindrical or parallelopiped. The maximum cross section of each individual pellet should be about ⅛ to ½ inch. While the production of cylindrically shaped pellets is preferred, the invention in its broadest aspects contemplates producing pellets of any suitable configuration. For example, the pellets may be cube-shaped. The bulk density of pellets produced in the present invention is at least 65 lbs/ft$^3$.

The pellets as described herein may be used in firing any type of industrial or domestic furnace. Pellets having a cross section of approximately ½ inch will burn at a uniform rate and develop approximately 7200-9000 Btu/lb. They are easily transported on commercially available belt conveyors or screw-type feeders. Because the pellets have a substantially uniform shape and dimension, they may be pneumatically conveyed. In addition, the pellets may be ground for use in suspension firing of furnaces or boilers. Ground sorghum bagasse pellets also provide an efficient fuel for direct combustion in turbines. Pellet combustion produces minimal quantities of ash, avoiding abrasive damage to metallic turbine components.

In addition, combustion of the pellets of the invention produces minimal amounts of pollution. Because low-nitrogen sorghum varieties are used, the finished pellets will contain not more than about 0.60% by weight total nitrogen. Accordingly, pellet combustion will produce minimal amounts of nitrogen oxides. Because sorghum is naturally low in sulphur, minimal quantities of sulphur oxides will also be produced.

The invention, as described above, may be varied in certain aspects. For example, pellet production may be accomplished continuously or in separate batches. In addition, operating parameters may be varied, depending on many factors. These factors include available feed stock materials, economic considerations, and energy needs of specific consumers. However, it is to be understood that these and other variations can be made by those skilled in the art without departing from the spirit and scope of the invention.

We claim:
1. A method of storing sweet sorghum preparatory to pelletizing it for use as a combustible fuel product comprising:
  removing a majority of sugar-containing fluid from said sorghum to leave a residue of ligno-cellulosic bagasse;
  piling said bagasse on a hard surface;
  compressing said piled bagasse to form a compacted mass, whereby said compressing frees air trapped within said bagasse to inhibit microbial and fungal oxidative degradation thereof; and
  storing said compacted mass preparatory to pelletizing the same.
2. The method of claim 1 in which said bagasse is piled at least 10 feet high.
3. The method of claim 1 in which said bagasse is piled about 20 feet high.
4. The method of claim 1 in which said compressing of said piled bagasse is accomplished by application of at least 35 psi of pressure.
5. The method of claim 1 in which said compressing of said piled bagasse is accomplished by application of about 60 psi.

* * * * *